Feb. 7, 1928.

F. E. ALTMAN 1,658,365

OBJECTIVE

Filed Feb. 6, 1924

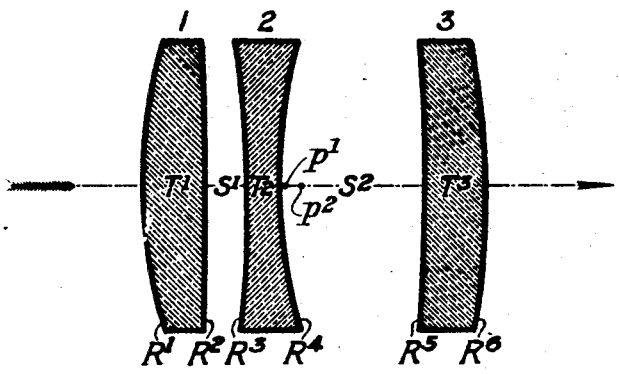

F/6; FOCAL LENGTH=1.000

| LENS | FOCAL LENGTH | GLASS | RADII | THICKNESS AND SEPARATIONS |
|---|---|---|---|---|
| 1 | +.343 | D=1.611<br>G=1.624<br>$\nu$=57.2 | $R^1$=2.39<br>$R^2$=1.970 | $T^1$=.026<br>$S^1$=.018 |
| 2 | -.284 | D=1.575<br>G'=1.593<br>$\nu$=42.7 | $R^3$=.541<br>$R^4$=.247 | $T^2$=.012 |
| 3 | +.747 | D=1.611<br>G'=1.624<br>$\nu$=57.2 | $R^5$=1.464<br>$R^6$=.356 | $T^3$=.026 |

THE FOCAL LENGTH OF THE REAR COMPONENT IS, OF COURSE, THAT OF ITS SINGLE ELEMENT, +.747, WHILE THAT OF THE FRONT COMPONENT IS −4.64.

Fred E. Altman,
INVENTOR,

BY R. L. Stuslfeld
N. M. Perrins
ATTORNEYS.

Patented Feb. 7, 1928.

1,658,365

UNITED STATES PATENT OFFICE.

FRED E. ALTMAN, OF ROCHESTER, NEW YORK, ASSIGNOR TO EASTMAN KODAK COMPANY, OF ROCHESTER, NEW YORK, A CORPORATION OF NEW YORK.

OBJECTIVE.

Application filed February 6, 1924. Serial No. 691,050.

This invention relates to a photographic objective and more particularly to an objective comprising three air spaced elements of which the two outer are positive and the inner one is negative.

The object of my invention is to produce such an objective particularly suited to quantity production for folding hand cameras and particularly attention has been paid to those features which render manufacture and assembly simple and inexpensive.

Certain of these features will be pointed out. All the surfaces should be as flat as possible, that is, have long radii of curvature, as such surfaces are easier and cheaper to grind. The over-all length of the objective should be short so that it can be fitted into a compact folding camera and in order to obtain wide covering power with even illumination. This is attained largely by decreasing the larger air space to an extent not hitherto attempted, and this I consider an important feature. At the same time, the smaller air space should not be too small as the spacing ring for it will then be so thin as to render assembly more difficult, and as an objective is very delicate to slight variations in a small space, whereas if the space is greater more tolerance in the exactness of assembly is permitted. All of the lenses are of considerable thickness, so that their edges are not easily chipped and the objective is rendered rugged and capable of withstanding rougher handling than if the elements were very thin.

In practice, each objective is individually fitted to the camera upon which it is to be used; and, despite care in manufacture there are found to be slight variations in the focal lengths and the quality of the objectives. It, therefore, has been found in practice that corrections of an objective should be as little sensitive to slight changes in spacing as possible. Similar practical considerations have also shown it desirable that the Gauss points of an objective should be as nearly central as possible.

The objective here described has been designed with all these considerations in view and I have found that they are best attained by spacing the two elements that form one, usually the front, component of the objective by a distance between .015 and .025 of the focal length of the objective, and by making the single positive lens comprising the other component of meniscus form, convex outwardly, and of a focal length considerably less than the focal length of the entire objective. It follows that the first component, comprising the two lenses, must then be strongly dispersive. Both of the elements of the component have longer focal lengths than is customary in this type of objective.

I have found it possible with such an arrangement, and using barium crown glass for the positive elements, and light flint for the negative, to fulfill the conditions mentioned.

In the accompanying table are set forth the data of a preferred example.

The objective here specified is designed to work at F/7.5 to F/8 at which it fully covers an angle of 32° from the axis. It is corrected particularly for freedom from distortion, chromatic and spherical aberration, coma and astigmatism. In the table and on the accompanying drawing the successive lenses from front to rear are designated 1 to 3 respectively; the radii of curvature of the successive surfaces, $R^1$ to $R^6$; the thicknesses of the successive lenses, $T^1$ to $T^3$; and the widths of the air spaces $S^1$ and $S^2$. There is also given in the table the focal length of each of the lenses and the index of refraction of the glass for the D and G' lines and the value of the dispersive ratio ($v$) for the glass used.

Dimensions are given in decimals of the focal length of the complete objective.

Table for objective with aperture = F/8; focal length = 1.000.

| Lens | Focal length | Glass | Radii | Thickness and separations |
|---|---|---|---|---|
| 1 | +.343 | D = 1.611<br>G = 1.624<br>$v$ = 57.2 | $R^1$ = .239<br>$R^2$ = 1.970 | $T^1$ = .026<br>$S^1$ = .018 |
| 2 | −.284 | D = 1.575<br>G' = 1.593<br>$v$ = 42.7 | $R^3$ = .541<br>$R^4$ = .247 | $T^2$ = .012<br>$S^2$ = .066 |
| 3 | +.747 | D = 1.611<br>G' = 1.624<br>$v$ = 57.2 | $R^5$ = 1.464<br>$R^6$ = .356 | $T^3$ = .026 |

The focal length of the rear component is, of course, that of its single element, +.747, while that of the front component is −4.64.

The positions of the Gauss points, indicated at $p^1$ and $p^2$, are respectively .002 and .009 behind the surface $R^4$; and I find it desirable that the front Gauss point should be close to this surface.

It is to be noted that the thickness of the entire objective is .148; and the greatest curvature is on a radius of .239.

It may be mentioned that the focus of the objective may be adjusted by movement of lens 1 toward and from lens 2, as in a screw threaded mount. The objective can, therefore, be used on a fixed lens board and be focused by this means.

It is to be understood that the above specified objective is an example and that I contemplate as within the scope of my invention such modifications and equivalents as fall within the terms of the appended claims.

Having thus described my invention, what I claim as new and desire to secure by Letters Patent is:

1. A photographic objective of the type comprising three single spaced elements of which the two outer elements are positive and the inner element is negative, characterized by one space being between .015 and .025 and the other space being less than .075 of the focal length of the objective and the whole objective having a thickness less than .16 of its focal length.

2. A photographic object of the type comprising three single spaced elements of which the two outer elements are positive and the inner element is negative, characterized by one space being between .015 and .025 and the other space being less than .075 of the focal length of the objective and the radius of each surface being greater than two-tenths of the focal length of the objective and the whole objective having a thickness less than .16 of its focal length.

3. A photographic objective comprising one component with an outer positive and an inner negative lens spaced apart by a distance less than .025 of the focal length, and a second component comprising a single positive lens, distant from the negative lens by a distance less than .075 of the focal length of the objective, the Gauss points being both situated in the larger space and one of them being distant from the negative lens by less than .005 of the focal length of the objective and the whole objective having a thickness less than .16 of its focal length.

4. A photographic objective comprising one component with a single outer positive and a single inner negative lens spaced apart by a distance less than .025 of the focal length, and a second component comprising a single positive lens, distant from the negative lens by a distance less than .075 of the focal length of the objective, the Gauss points being both situated in the larger space and one of them being distant from the negative lens by less than .005 of the focal length of the objective, each of the radii of curvature being greater than two-tenths of the focal length of the objective and the whole objective having a thickness less than .16 of its focal length.

5. A photographic objective of the type comprising three air spaced elements, of which the two outer are positive and of barium crown glass and the inner is negative and of flint glass having a refractive index less than 1.60 characterized by the radii of curvature, being each greater than two-tenths; and the elements being each thicker than eleven-thousandths of the focal length of the objective.

6. A photographic objective of the type comprising one component having a single outer positive lens and a single inner negative lens spaced apart by a distance less than .025 of the focal length of the objective, and a second component comprising a single positive lens, characterized by the single positive lens having a focal length less than .90, the negative lens having a focal length greater than .25, and the positive lens in the first component having a focal length greater than .30, of the focal length of the objective and the whole objective having a thickness less than .16 of its focal length.

7. A photographic objective comprising three air spaced elements of which the two outer are positive and of crown glass having a refractive index greater than 1.60, and the inner is negative and of flint glass refractive index less than 1.60, and in which two of the elements are spaced by a distance less than .025 of the focal length of the objective forming one component of the objective, while the space between the inner lens and the other outer lens is sufficient to permit the mounting of a diaphragm and shutter, the other lens thus constituting a second component of the objective, the first component being pronouncedly dispersive and the second component having a focal length less than nine-tenths of that of the objective.

8. A photographic objective comprising three air spaced elements of which the two outer are positive and of flint glass having a refractive index greater than 1.60, and the inner is negative and of flint glass of refractive index less than 1.60, and in which two of the elements are spaced by a distance less than .025 of the focal length of the objective forming one component of the objective, while the space between the inner lens and the other outer lens is sufficient to permit the mounting of a diaphragm and shutter, the other lens thus constituting a second component of the objective, the first component being pronouncedly dispersive and the second component having a focal length less than nine-tenths of that of the objective, the Gauss points being situated in the larger air space and close to the negative lens.

9. A photographic objective of the type having one component consisting of an outer positive lens and an inner negative lens spaced apart and a second component comprising a single positive lens, the positive lenses being of barium crown glass, and the negative lens being of flint glass having a refractive index less than 1.60 characterized by the single positive lens being of meniscus form.

10. A photographic objective of the type having one component consisting of an outer positive lens and an inner negative lens spaced apart and a second component comprising a single positive lens, the positive lenses being of barium crown glass, and the negative lens being of flint glass having a refractive index less than 1.60 characterized by the single positive lens being of meniscus form with its convex surface outward, and having a focal length between forty and ninety per cent of the focal length of the objective.

11. A photographic objective of the type having one component consisting of an outer positive lens and an inner negative lens spaced apart and a second component comprising a single positive lens, the positive lenses being of barium crown glass, and the negative lens being of flint glass having a refractive index less than 1.60 characterized by the single positive lens being of meniscus form and having a focal length approximately three-quarters of the focal length of the objective, and the Gauss points of the objective being in the larger air space and close to the negative lens.

12. A photographic objective of the type having one component consisting of an outer positive lens and an inner negative lens spaced apart and a second component comprising a single positive lens, the positive lenses being of barium crown glass, and the negative lens being of flint glass having a refractive index less than 1.60 characterized by the single positive lens being of meniscus form with its convex side outward and having a focal length between forty and ninety per cent of the focal length of the objective, and by each of the three elements having a thickness greater than eleven-thousandths of the focal length of the objective, and by each of the six radii of curvature being greater than two-tenths of the focal length of the objective.

13. A photographic objective of the type comprising three air spaced elements of which the two outer are positive and of highly refractive crown glass and the inner is negative and of flint glass, and characterized by one of the positive lenses being of meniscus form, one of the spaces being between .015 and .025 and the other being less than .075 of the focal length of the objective.

14. A photographic objective of the type comprising three air spaced elements of which the two outer are positive and of highly refractive crown glass and the inner is negative and of flint glass, and characterized by one of the positive lenses being of meniscus form, one of the spaces being between .015 and .025 and the other being less than .075 of the focal length of the objective, and the radius of curvature of each of the surfaces being greater than two-tenths of the focal length of the objective.

15. A photographic objective of the type comprising three spaced elements of which the outer two are positive and of barium crown glass and the inner one is negative and of flint glass having a refractive index less than 1.60, the negative and one positive being spaced by a distance less than .025 of the focal length of the objective, and characterized by the following features: the distance from the negative to the other positive is less than .075 of the focal length of the objective; the other positive is of meniscus form and has a focal length less than .90 of the focal length of the objective; the Gauss points are in the larger space and close to the negative; each of the three elements has a thickness greater than .011 of the focal length of the objective; each of the radii of curvature is greater than two-tenths of the focal length of the objective.

Signed at Rochester, New York, this first day of February, 1924.

FRED E. ALTMAN.